United States Patent Office 3,522,192
Patented July 28, 1970

3,522,192
PALLADIUM-MERCURY CATALYSTS
Charles E. Maxwell III, Quaker Hill, Conn., assignor to Chas. Pfizer & Co., Inc., New York, N.Y., a corporation of Delaware
No Drawing. Filed Nov. 7, 1966, Ser. No. 592,330
Int. Cl. B01j 11/82
U.S. Cl. 252—432                                    4 Claims

ABSTRACT OF THE DISCLOSURE

Hydrogenation catalysts useful in selectively reducing acetylenic bonds to ethylenic bonds are obtained by reducing a palladium salt with sodium borohydride or with formaldehyde and sodium tetraborate and depositing mercury on the resulting palladium metal by treatment with an aqueous mercuric salt solution.

---

This invention relates to novel palladium-mercury catalysts for the selective hydrogenation of acetylenic to ethylenic bonds and to processes for the production thereof.

Lindlar in U.S. Pat. 2,681,938, issued June 22, 1954, describes a palladium-lead catalyst useful in the reduction of acetylenic to ethylenic bonds, which is produced by heating an aqueous solution of a lead salt with a slurry of reduced palladium metal catalyst until lead has been deposited upon the palladium. The use of bismuth salts and mixtures thereof with lead salts as deactivators is also disclosed by Lindlar.

It has now been discovered that deactivated palladium catalysts capable of catalyzing the hydrogenation of acetylenic bonds to ethylenic bonds can be obtained by contacting particulate reduced palladium metal with an aqueous mercuric salt solution until mercury is deposited on the palladium, and separating the treated catalysts from the aqueous mixture.

In a preferred embodiment of the present invention, a palladium salt is deposited on a suitable support material or carrier, e.g., calcium carbonate, barium sulfate, barium carbonate, magnesium oxide, etc., and the adsorbed palladium salt reduced to metallic palladium. The reduced catalyst is then contacted with an aqueous solution of a mercuric salt and the resultant deactivated catalyst is filtered, washed with water, and dried.

The temperture for treatment of the palladium with the mercuric salt is not critical. Ordinarily, room temperature will be most convenient, although the mixture may be warmed if desired without detrimental effect.

The precise chemical or physical change which occurs upon contact between the palladium and the aqueous mercuric salt solution is not yet fully understood. It is known that mercury is deposited on the palladium, but whether this is in elemental or ionic form has not been definitely established.

The mercury content of the treated catalyst is not critical, and excellent results are obtained over a wide range of mercury contents. Ordinarily, it will be preferred to deposit at least about 1% mercury, based on the total catalyst weight, but even lower mercury levels give good results. Mercury levels up to 20% or even higher may be used effectively, although there will usually be no added advantage to using levels above 20%. The mercury level is readily varied by simple alternation in the relative proportions of the mercuric salt and the palladium. The optimum ratios for a particular system are easily determined by experiment.

Suitable mercuric salts include mercuric acetate, mercuric nitrate, and mercuric chlorate, but of these, mercuric acetate is preferred. Palladium salts which have been found useful are palladium chloride, palladium nitrate, and palladium sulfate. Of these palladium chloride is the salt of choice. The palladium salt may be reduced to metallic palladium with hydrogen or with alkaline formaldehyde solution. However, the preferred reducing systems are either formaldehyde-sodium tetraborate, or sodium borohydride.

Surprisingly and unexpectedly, comparison of the catalyst prepared employing either of these preferred boron-containing systems with that produced by formaldehyde and potassium or sodium hydroxide, indicates that the presence of boron in the reducing system provides a more uniform product and enhances the activity of the product as a catalyst for the reduction of acetylenic to ethylenic bonds. That is to say, the reduction of acetylenic bonds proceeds substantially more rapidly when the catalyst is one whose preparation employed a boron-containing system.

The catalyst of the present invention can be advantageously used in the catalytic hydrogenation of organic compounds that contain both double and tripel bonds, e.g. oxenin. In the reduction only the acetylenic bonds are reduced, and these substantially to the ethylenic stage; the ethylenic bonds originally present in the compound or formed by the reduction, seem substantially unaffected. Of course, the selectivity of the new catalysts of this invention is equally important wherever it is desired to reduce an acetylenic bond to an ethylenic bond, even where the starting compound initially contains no ethylenic bonds. In particular, these catalysts are valuable for the reduction of acetylenic hydrocarbons or alcohols, e.g. propargyl alcohol, hexyne-,5,3-butyne-1-ol, etc.

The hydrogenation is usually carried out at atmospheric pressure and room temperature in the liquid phase, preferably in inert solvents such as n-hexane, pentane, isooctane, methanol, ethanol, and isopropanol. When hydrogenating compounds which contain several double bonds in addition to the triple bond or bonds, it may be desirable to add a small amount of quinoline to the reaction mixture prior to the reduction.

The present invention is further illustrated in the following examples; however, they are not to be considered as limiting the scope thereof in any way.

The percentage values are expressed on a weight/weight basis.

EXAMPLE I

To a suspension of 100 grams of calcium carbonate in 1200 ml. of water is added 100 ml. of an aqueous solution of palladium chloride containing 5% of palladium. The mixture is warmed to 55–60° C. over a period of 30 minutes and then 8 ml. of 37% formaldehyde is added. During the course of about 5 minutes, 10 grams of $Na_2B_4O_7 \cdot 10H_2O$ is added in small portions. The slurry becomes uniformly black and gives an alkaline reaction to litmus paper. The slurry is cooled, and the solid filtered, washed well with water until free of chloride ion, and dried at 100° C. in vacuo. It is resuspended in a solution of 9.5 grams of mercuric acetate in 1000 ml. of water and stirred at room temperature for four hours. The resultant catalyst is filtered, washed with water, and dried at 100° C. in vacuo.

EXAMPLE II

The procedure of Example I is repeated but in place of $Na_2B_4O_7 \cdot 10H_2O$, enough sodium hydroxide solution is added during the reduction to keep the solution alkaline to litmus paper. The resulting catalyst proves somewhat les active than that of Example I.

EXAMPLE III

The procedure of Example I is repeated but in place of $Na_2B_4O_7 \cdot 10H_2O$, enough potassium hydroxide solution is added during the reduction to keep the solution alkaline to litmus. The resulting catalyst exhibits an activity similar to that of Example II.

EXAMPLE IV

To 100 ml. of an aqueous palladium chloride solution containing 5% of palladium, which is at a temperature between 55 and 60° C., is added 8 ml. of a 37% formaldehyde solution. Over a period of about 5 minutes, 10 grams of $Na_2B_4O_7 \cdot 10H_2O$ is added to the mixture in small portions. The black, reduced palladium is filtered, washed well with water, and dried.

The palladium is resuspended in about 100 ml. of distilled water, and to this aqueous suspension is added a solution of 5 grams of mercuric acetate in 20 ml. of water. The resultant suspension is stirred, first at room temperature for 2 hours, and then on a steam-bath for 1 hour. The catalyst is filtered, washed, and dried.

EXAMPLE V

To a suspension of 150 grams of calcium carbonate in 1800 ml. of water is added slowly with stirring 150 ml. of a palladium chloride solution containing 5% of palladium. The suspension is stirred at room temperature for a half hour. During a period of about 10 minutes, 12 g. of sodium borohydride is added. The temperature of the slurry rises to about 35° C. The black precipitate is stirred for one hour, filtered, washed well with water, and dried at 100° C. in vacuo.

To a suspension of 25 grams of this catalyst is added a solution of 6 grams of mercuric acetate in a 100 ml. of water. The resultant suspension is stirred at room temperature for 4 hours. The catalyst is filtered, washed with water, and dried at 100° C. in vacuo. A similar catalyst is prepared by substituting 8 g. mercuric acetate for 6 grams, in this procedure.

EXAMPLE VI

To a suspension of 100 grams of calcium carbonate in 1 liter of water is added 100 ml. of an aqueous solution of palladium chloride containing 5% of palladium. The mixture is warmed to 55–60° C. over a period of 30 minutes. The hot slurry is stirred under hydrogen, which is at atmospheric pressure and room temperature, until the adsorption of hydrogen ceases. The reduced palladium is filtered and washed thoroughly with water. The palladium is resuspended in a solution of 10 grams of mercuric acetate in 1 liter of water and stirred for 4 hours. The catalyst is filtered, washed well with water, and dried in vacuo.

EXAMPLE VII

A 5% sodium hydroxide solution is added to 100 ml. of an aqueous palladium chloride solution containing 5% of palladium, which is at about 60° C., until no further precipitate forms. While the suspension is still warm, it is shaken under hydrogen until the hydrogen uptake ceases. The reduced palladium metal thus formed is separated by filtration, washed with water, and resuspended in about 100 ml. of water. To this aqueous suspension of the metal, is added a solution of 5 grams of mercuric acetate in 20 ml. of water. The resultant suspension is stirred at room temperature for 2 hours and then on a steam bath for 1 hour. The catalyst is filtered, washed, and dried.

EXAMPLE VIII 30.2 grams of oxenin (3,7-dimethyl-9-(2,6,6-trimethyl-1 - cyclohexen - 1 - yl)nona-2,7-diene-4-yne-1,6-diol) are placed in 90 ml. of n-hexane together with 1.51 grams of the catalyst of Example I. 0.6 ml. of quinoline is added, together with 90 mg. of potassium carbonate. The mixture is stirred at room temperature under hydrogen at atmospheric pressure, until approximately 113% (by volume) of the calculated amount of hydrogen theoretically necessary for the conversion of the triple bond to the double bond is adsorbed. After 22 minutes, the hydrogen uptake diminishes almost completely and the product, hydroxenin, begins to crystallize out of the reaction mixture. The mixture is sufficiently heated until all the organic material dissolves. The catalyst is filtered and the filtrate cooled to induce the crystallization of the hydroxenin. The hydroxenin is filtered, washed with a little cold n-hexane, and dried under reduced pressure at room temperature. The melting point is 73–74° C.

EXAMPLE IX

The procedure of Example VIII is repeated using the catalysts of Examples IV and V with similar results.

EXAMPLE X

The procedure of Example VIII is repeated using the catalysts of Examples II, III, VI and VII. The hydrogen uptake is somewhat slower, typically requiring about 3 hours for substantial completion of the reaction.

EXAMPLE XI

The catalysts of Examples I through VII are also successfully employed to reduce the acetylenic bonds to ethylenic bonds in each of the following compounds: Hexyne-5, propargyl alcohol, 3-butyne-1-ol, phenylpropargyl alcohol, propargyl acetate, ethyl propiolate.

What is claimed is:

1. In the process for the preparation of a hydrogenation catalyst having enhanced selectivity to catalyze the hydrogenation of an acetylenic bond substantially only to an ethylenic bond, the improvement which comprises contacting particulate reduced palladium metal, obtained by reducing a palladium salt with formaldehyde in the presence of sodium tetraborate, with an aqueous mercuric salt solution until mercury is deposited on the palladium catalyst to enhance the selectivity of said catalyst, and separating the thusly modified catalyst from the aqueous mixture.

2. The process of claim 1 wherein the reduced palladium is supported on a carrier.

3. The process of claim 1 wherein said palladium salt is palladium chloride and said mercuric salt is mercuric acetate.

4. The process of claim 2 wherein the carrier is calcium carbonate and the mercuric salt is mercuric acetate.

References Cited

UNITED STATES PATENTS

| | | | |
|---|---|---|---|
| 2,818,393 | 12/1957 | Lefrancois | 252—466 |
| 3,123,574 | 3/1964 | Zajcew | 252—447 |
| 3,057,807 | 10/1962 | Cox | 252—432 |
| 1,991,448 | 2/1935 | Connolly | 23—233 |
| 2,751,333 | 6/1956 | Heinemann | 196—50 |
| 2,857,337 | 10/1958 | Hamilton | 252—472 |
| 1,338,709 | 5/1920 | Sulzberger | 252—432 X |

DANIEL E. WYMAN, Primary Examiner

P. M. FRENCH, Assistant Examiner

U.S. Cl. X.R.

252—443, 473